United States Patent
Okumura et al.

(10) Patent No.: US 11,624,658 B2
(45) Date of Patent: Apr. 11, 2023

(54) NEAR-INFRARED SENSOR COVER

(71) Applicants: TOYODA GOSEI CO., LTD., Kiyosu (JP); IMUZAK CORPORATION, Yamagata-ken (JP)

(72) Inventors: Koji Okumura, Kiyosu (JP); Koji Fukagawa, Kiyosu (JP); Kazumi Sawamura, Yamagata (JP)

(73) Assignees: TOYODA GOSEI CO., LTD., Aichi-pref. (JP); IMUZAK CORPORATION, Yamagata (JP)

( * ) Notice: Subject to any disclaimer, the term of this patent is extended or adjusted under 35 U.S.C. 154(b) by 334 days.

(21) Appl. No.: 17/096,204

(22) Filed: Nov. 12, 2020

(65) Prior Publication Data
US 2021/0148761 A1   May 20, 2021

(30) Foreign Application Priority Data

Nov. 18, 2019   (JP) .............................. JP2019-207790

(51) Int. Cl.
| | |
|---|---|
| *B60Q 1/00* | (2006.01) |
| *G01J 5/04* | (2006.01) |
| *G01S 7/481* | (2006.01) |
| *G01J 5/061* | (2022.01) |
| *H05B 3/84* | (2006.01) |
| *G01J 1/04* | (2006.01) |
| *G01S 17/931* | (2020.01) |

(52) U.S. Cl.
CPC .............. *G01J 5/04* (2013.01); *G01J 1/0407* (2013.01); *G01J 5/061* (2013.01); *G01S 7/4813* (2013.01); *H05B 3/845* (2013.01); *G01J 2005/063* (2013.01); *G01S 17/931* (2020.01)

(58) Field of Classification Search
CPC .. G01J 5/04; G01J 1/0407; G01J 5/061; G01J 2005/063; G01S 7/4813; G01S 17/931; H05B 3/845
USPC .......................................................... 340/436
See application file for complete search history.

(56) References Cited

U.S. PATENT DOCUMENTS

| | | | | |
|---|---|---|---|---|
| 5,543,620 A | * | 8/1996 | Lin | ........................ G01J 5/08 250/353 |
| 2010/0265986 A1 | * | 10/2010 | Mullin | .................... G01J 5/025 374/1 |
| 2019/0374375 A1 | * | 12/2019 | McGregor | ................ A61F 7/02 |

FOREIGN PATENT DOCUMENTS

| | | |
|---|---|---|
| JP | 2018-031888 A | 3/2018 |
| WO | 2016/012579 A1 | 1/2016 |

* cited by examiner

*Primary Examiner* — Naomi J Small
(74) *Attorney, Agent, or Firm* — Posz Law Group, PLC

(57) ABSTRACT

A near-infrared sensor cover includes a cover body having transmissiveness to near-infrared rays. The cover body includes a base and a heater unit. The heater unit is arranged rearward of the base in a transmission direction of the near-infrared rays and includes a wire-like heating element. The heating element is configured to generate heat when energized. The base includes a rear portion that includes a rear surface of the base in the transmission direction. In the rear portion of the base, at least part of a section that is different from a section in which the heater unit is provided is formed by a reflection suppression structure including asperities. The asperities include a reflection suppression surface that is inclined relative to the transmission direction and reduces reflection of the near-infrared rays.

7 Claims, 4 Drawing Sheets

NEAR-INFRARED SENSOR COVER

BACKGROUND

1. Field

The present disclosure relates to a near-infrared sensor cover configured to cover a transmitting unit and a receiving unit for near-infrared rays in a near-infrared sensor.

2. Description of Related Art

A near-infrared sensor mounted on a vehicle includes a transmitting unit and a receiving unit for near-infrared rays. The transmitting unit and the receiving unit are covered with a cover body of a near-infrared sensor cover. The cover body has transmissiveness to near-infrared rays.

In the near-infrared sensor above, the transmitting unit transmits near-infrared rays to the outside of the vehicle through the cover body. After striking and being reflected by an object outside the vehicle, the near-infrared rays return to and are received by the receiving unit through the cover body. On the basis of the transmitted near-infrared rays and the received near-infrared rays, the near-infrared sensor recognizes the object outside the vehicle, and detects parameters such as the distance between the vehicle and the object and the relative velocity.

When snow accumulates on the near-infrared sensor, the accumulated snow hinders passage of near-infrared rays. Accordingly, the near-infrared sensor is configured to temporarily stop detection when snow accumulates on the sensor. However, due to widespread use of near-infrared sensors, it is desired that the object recognition function and the detection function can be fulfilled during snowfall.

Accordingly, various types of near-infrared sensor covers equipped with a snow melting function have been developed. For example, International Publication No. 2016/12579 and Japanese Laid-Open Patent Publication No. 2018-31888 disclose near-infrared sensor covers including a cover body and a heater unit. The framework of the cover body is formed by a transparent base. The heater unit is stacked on the base of the cover body from the rear side in the transmission direction of the near-infrared rays. In Japanese Laid-Open Patent Publication No. 2018-31888, a heater film is used as the heater unit. The heater film includes a wire-like heating element that generates heat when energized. When snow accumulates on the cover body, the snow is melted by the heat from the heating element, which is generated when the heating element is energized. This allows the near-infrared sensor to fulfill the object recognition function and the detection function, even when it is snowing.

Further, the near-infrared sensor cover disclosed in Japanese Laid-Open Patent Publication No. 2018-31888 includes a reflection suppression layer, which reduces reflection of near-infrared rays. The reflection suppression layer is formed on the rear surface of the cover body in the transmission direction. The reflection suppression layer is made of a dielectric substance such as magnesium fluoride (MgF2), and is formed by performing vacuum deposition, sputtering, or wet coating. When a heater film, which is the heater unit, is arranged at the rearmost section of the cover body in the transmission direction, the reflection suppression layer is formed on the rear surface of the heater film in the transmission direction.

When the transmitting unit of the near-infrared sensor transmits near-infrared rays, the near-infrared rays are radiated on the rear surface of the cover body in the transmission direction. At this time, the reflection suppression layer reduces reflection of the radiated near-infrared rays on the rear surface of the cover body. In proportion to the reduction in the reflection, the amount of the near-infrared rays passing through the reflection suppression layer and the cover body is increased.

However, in order to form the cover body of the above-described near-infrared sensor cover, which includes the heater film and the reflection suppression layer, the reflection suppression layer needs to be attached to the rear surface of the heater film after the heater film is bonded to the rear surface of the base in the transmission direction. This involves a troublesome work.

SUMMARY

Accordingly, it is an objective of the present disclosure to provide a near-infrared sensor cover provided with a function of reducing reflection of near-infrared rays, without performing an operation of adding a reflection suppression layer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a near-infrared sensor cover is provided that is configured to cover a transmitting unit and a receiving unit for near-infrared rays in a near-infrared sensor. The near-infrared sensor cover includes a cover body having transmissiveness to near-infrared rays. The cover body includes a base made of a plastic and a heater unit that is arranged rearward of the base in a transmission direction of the near-infrared rays and includes a wire-like heating element. The heating element is configured to generate heat when energized. The base includes a rear portion that includes a rear surface of the base in the transmission direction. In the rear portion of the base, at least part of a section that is different from a section in which the heater unit is provided is formed by a reflection suppression structure including asperities. The asperities include a reflection suppression surface that is inclined relative to the transmission direction and reduces reflection of the near-infrared rays.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A near-infrared sensor cover 21 according to a first embodiment will now be described with reference to FIGS. 1 to 3.

In the following description, the direction in which the vehicle 10 advances forward will be referred to as the front, and the reverse direction will be referred to as the rear. The vertical direction refers to the vertical direction of the vehicle 10, and the left-right direction refers to the vehicle width direction that matches with the left-right direction as viewed from a front-facing occupant.

Figure 1:
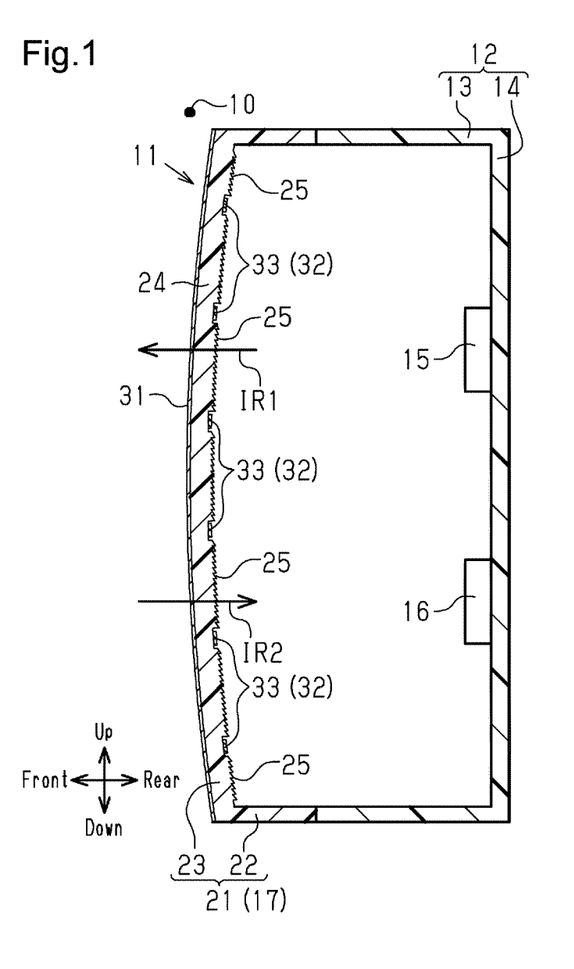
FIG. 1 is a cross-sectional side view of a near-infrared sensor including a near-infrared sensor cover according to a first embodiment.
Figures 2A, 2B:
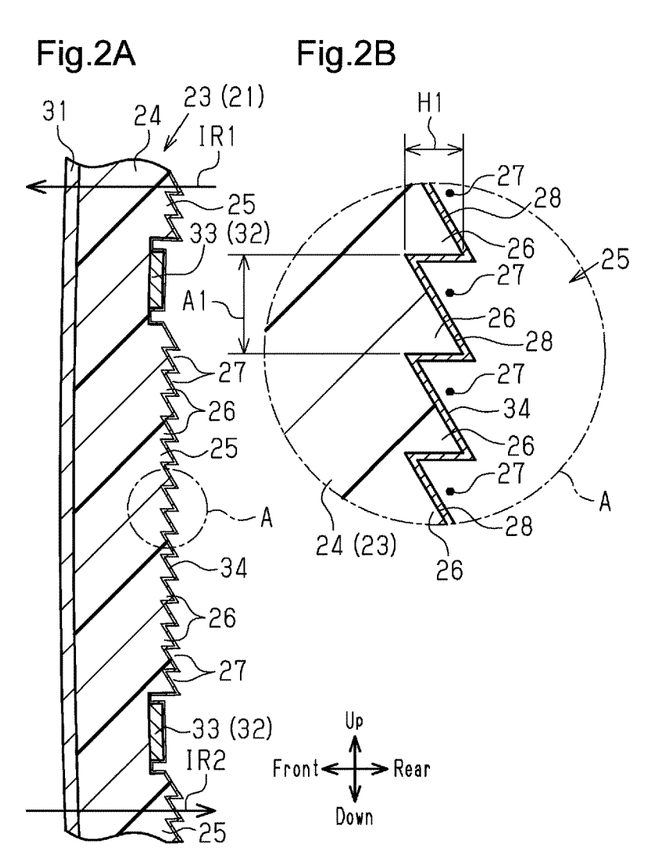
FIG. 2A is an enlarged partial cross-sectional side view showing part of the cover body in FIG. 1.
FIG. 2B is an enlarged cross-sectional side view showing section A in FIG. 2A.
Figure 3:
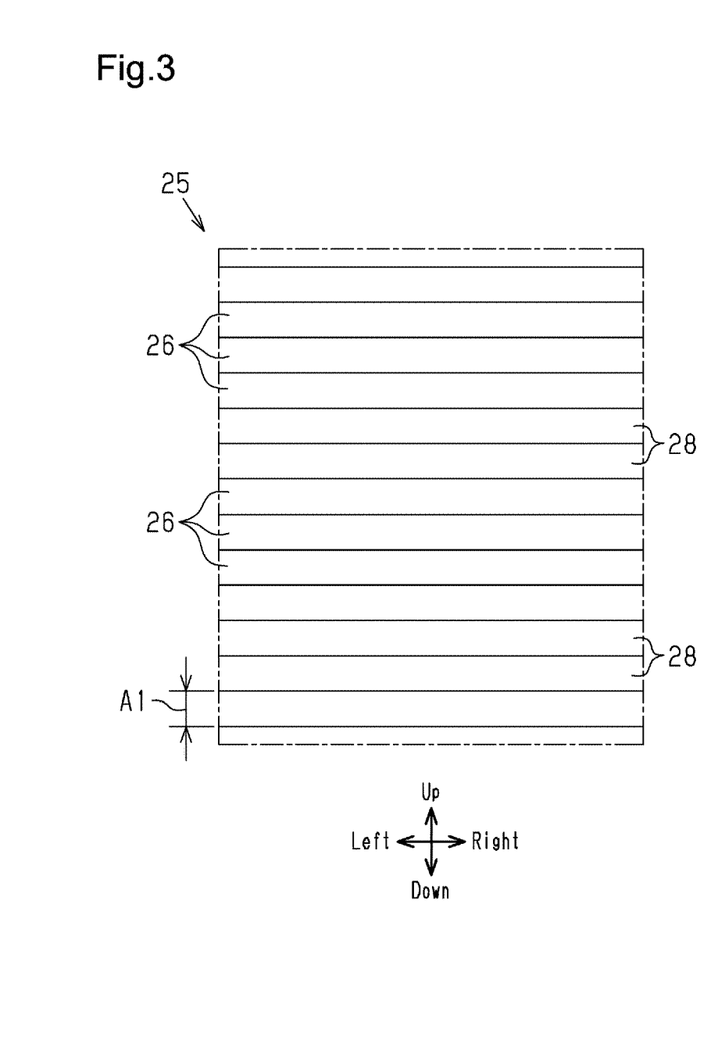
FIG. 3 is an enlarged partial rear view illustrating the reflection suppression structure according to the first embodiment.

In FIGS. 1 to 3, in order to make the size of each component of the near-infrared sensor cover 21 recognizable, the scale of each component is altered as necessary. The same applies to FIGS. 4 to 6, which illustrate a second embodiment, and FIGS. 7 to 9, which illustrate a modification.

As shown in FIG. 1, the vehicle 10 includes a near-infrared sensor 11 in the front end section. The near-infrared sensor 11 is configured to transmit infrared rays IR1 having a wavelength of around 900 nm forward from the vehicle 10 and receive infrared rays IR2 that have struck and been reflected by an object outside the vehicle 10, such as a leading vehicle or a pedestrian. On the basis of the transmitted near-infrared rays IR1 and the received near-infrared rays IR2, the near-infrared sensor 11 recognizes the object outside the vehicle 10, and detects the distance between the vehicle 10 and the object and the relative velocity.

As described above, the near-infrared sensor 11 transmits the near-infrared rays IR1 forward from the vehicle 10. Thus, the transmission direction of the near-infrared rays IR1 from the near-infrared sensor 11 is the direction from the rear toward the front of the vehicle 10. The front in the transmission direction of the near-infrared rays IR1 substantially matches with the front of the vehicle 10. The rear in the transmission direction also substantially matches with the rear of the vehicle 10. Accordingly, in the following description, the front in the transmission direction of the near-infrared rays IR1 will simply be referred to as "front" or "forward." The rear in the transmission direction will simply be referred to as "rear" or "rearward."

The rear half of the outer shell of the near-infrared sensor 11 is formed by a case 12. The front half of the outer shell of the near-infrared sensor 11 is formed by a cover 17. The case 12 includes a tubular peripheral wall 13 and a bottom wall 14, which is provided at the rear end of the peripheral wall 13. The case 12 has the shape of a tube with an open front end and a closed end. The case 12 is entirely made of a plastic such as a polybutylene terephthalate (PBT). A transmitting unit 15, which transmits the near-infrared rays IR1, and a receiving unit 16, which receives the near-infrared rays IR2, are arranged on the front side of the bottom wall 14.

The cover 17 of the near-infrared sensor 11 is formed by the near-infrared sensor cover 21. The near-infrared sensor cover 21 includes a tubular peripheral wall 22 and a plate-shaped cover body 23 provided at the front end of the peripheral wall 22.

The cover body 23 is shaped to have a size sufficient to close the opening at the front end of the case 12. The cover body 23 is located forward of the bottom wall 14 and covers the transmitting unit 15 and the receiving unit 16 from the front.

As shown in FIGS. 1 and 2A, the framework of the cover body 23 includes a base 24. The base 24 is made of a transparent plastic having transmissiveness to the near-infrared rays IR1, IR2. The term "transparent" as used in the present disclosure includes not only "colorless transparent," but also "colored transparent." In the first embodiment, the base 24 is made of polycarbonate (PC). However, the base 24 may be made of other material such as polymethacrylic acid methyl (PMMA) or cycloolefin polymer (COP).

A hard coating layer 31 is stacked on the front surface of the base 24. The hard coating layer 31 has transmissiveness to the near-infrared rays IR1, IR2 and has a hardness higher than that of the base 24. The hard coating layer 31 is formed by applying a known surface treatment agent to the front surface of the base 24. The surface treatment agent may be an organic hard coating agent, an inorganic hard coating agent, and an organic-inorganic hybrid hard coating agent. The organic hard coating agent includes an acrylate-based surface treatment agent, an oxetane-based surface treatment agent, and a silicone-based surface treatment agent. The hard coating agent may be a type that is cured by being irradiated with ultraviolet (UV) light or a type that is cured when heated.

A heater unit 32 is provided rearward of the base 24. The heater unit 32 is formed by a heating element 33, which generates heat when energized. The material of the heating element 33 is, for example, a metal such as silver or copper, metal oxide-based conductive material such as indium tin oxide (ITO) or tin oxide, a carbon heating element, or a conductive paste. The heating element 33 is formed on part of the rear surface of the base 24 by performing sputtering, printing, or application of the material using a dispenser (liquid constant delivery device). The conductive paste may include, for example, silver particles serving as a filler dispersed in a plastic material.

The heating element 33 is formed by a wire and includes parallel straight sections and coupling sections, which connect ends of adjacent straight sections together. Unlike a conventional heating element, no heater film is used as the heater unit 32 in the first embodiment.

The base 24 includes a rear portion that includes the rear surface of the base 24. The base 24 includes reflection suppression structures 25. The reflection suppression structures 25 are provided in sections in the rear portion of the base 24 that are different from sections in which the heater unit 32 is provided. The reflection suppression structures 25 reduce reflection of the near-infrared rays IR1, which are transmitted from the transmitting unit 15.

FIG. 3 is an enlarged view of a reflection suppression structure 25. A hydrophilization film 34, which will be discussed below, is not illustrated in FIG. 3. As shown in FIGS. 2A, 2B, and 3, each reflection suppression structure 25 includes minute protrusions 26 having the same cross-sectional shapes. In the first embodiment, the cross-sectional shape of each protrusion 26 is a right triangle. The protrusions 26 are formed to extend to be adjacent to and parallel with each other. The height H1 of each protrusion 26 from the base to the vertex is constant in the direction in which the protrusion 26 extends. The space between adjacent two of the protrusions 26 forms a minute groove 27 having a triangular cross section. Combinations of the protrusions 26 and the grooves 27 are repeated in the arrangement direction of the protrusions 26 (vertical direction as viewed in FIGS. 2A and 3). That is, the combinations of the protrusions 26 and the grooves 27 are regularly arranged in the arrangement direction of the protrusions 26. Since the protrusions 26 and the grooves 27 are arranged in this manner, the reflection suppression structures 25 are each configured to have a moth-eye structure with minute asperities. The moth-eye structure refers to an asperity structure as observed on the surface of the eye of a moth, and has an average cycle shorter than the wavelength of rays (the near-infrared rays IR1 in the first embodiment). Each protrusion 26 includes a reflection suppression surface 28, which is inclined relative to the transmission direction of the near-infrared rays IR1 and reduces reflection of the near-infrared rays IR1. The height H1 of each protrusion 26 is set to be in the range from 150 nm to 400 nm. The measurement A1 of the base of each protrusion 26 in the arrangement direction of the protrusions 26 is set to be in the range from 170 nm to 200 nm. The cross section of each reflection suppression structure 25 is triangular wave-shaped (sawtooth shaped) as a whole.

The reflection suppression structures 25 are formed by a plastic molding method such as an injection molding using a molding die. The molding die has minute asperities, which are reversed shapes of the reflection suppression structures 25, on the molding surfaces. The minute asperities on the molding surface of the molding die are formed by performing minute precision machining on the molding surface. For example, cutting of the molding surface is performed by moving the molding die while finely vibrating a cutting tool of a microfabrication device. Since the plastic molding is performed using the molding die, the minute asperities on the molding surface of the molding die are transferred to the plastic, so that the base 24 having the reflection suppression structures 25 with minute asperities is formed.

As shown in FIGS. 2A and 2B, the heater unit 32 and the reflection suppression structures 25 are covered with the hydrophilization film 34, which is formed on the rear surfaces of the heater unit 32 and the reflection suppression structures 25. The hydrophilization film 34 contains evenly dispersed fine particles (nanoparticles) in the order of nanometers of metal oxide. For example, silica ($SiO_2$) may be used as the metal oxide. Further in the first embodiment, the hydrophilization film 34 is formed to have a water contact angle less than 10 degrees. The hydrophilization film 34 may be formed through mixed adsorption (alternate adsorption) of fine particles (nanoparticles) in the order of nanometers of metal oxide.

The transmissivity to the near-infrared rays IR1, IR2 of the cover body 23, which has the above-described structure, is 60% or higher. The reflectance of the near-infrared rays IR1 at the rear surface of the cover body 23 is 10% or lower.

An operation of the first embodiment, which is configured as described above, will now be described. Advantages that accompany the operation will also be described.

In the first embodiment, each reflection suppression structure 25 includes the protrusions 26, which are adjacent to and parallel with each other. Each protrusion 26 has a triangular cross section and includes the reflection suppression surface 28, which is inclined relative to the front-rear direction. Each reflection suppression structure 25 of the first embodiment, which has the above-described configuration, reduces reflection using the moth-eye structure. When the transmitting unit 15 of the near-infrared sensor 11 transmits the near-infrared rays IR1, the near-infrared rays IR1 are radiated on the rear surface of the cover body 23 as shown in FIGS. 1 and 2A. At this time, the reflection suppression surfaces 28 reduce reflection of the near-infrared rays IR1, which are radiated on the reflection suppression structures 25 through the hydrophilization film 34. That is, due to the moth-eye structure, the pseudo-refractive index continuously changes from the vertex to the base of each protrusion 26. This effectively reduces reflection of the near-infrared rays IR1 on the rear surface of the cover body 23.

Particularly, in each reflection suppression structure 25, the height H1 of each protrusion 26 is set to be in the range from 150 nm to 400 nm, so that the height H1 is less than half the wavelength of the near-infrared rays IR1, which pass through. Also, the measurement A1 of each protrusion 26 is set to be in the range from 170 nm to 200 nm, so that the measurement A1 is less than half the wavelength of the near-infrared rays IR1, which pass through. These settings further reduce reflection of the near-infrared rays IR1.

The reflection suppression structures 25 reduce the reflectance of the near-infrared rays IR1 to 10% or lower. In correspondence with the reduction, the amount of the near-infrared rays IR1 that pass through the reflection suppression structures 25 is increased.

The near-infrared rays IR1, which have passed through the reflection suppression structures 25, pass through a portion of the base 24 that is forward of the reflection suppression structures 25, and the hard coating layer 31 in that order. In this manner, the near-infrared rays IR1 pass through the cover body 23.

After passing through the cover body 23, the near-infrared rays IR1 strike and are reflected by an object, such as a leading vehicle or a pedestrian. The reflected near-infrared rays IR2 again pass through the hard coating layer 31, the base 24, which includes the reflection suppression structures 25, and the hydrophilization film 34 in that order. After passing through the cover body 23, the near-infrared rays IR2 are received by the receiving unit 16. On the basis of the transmitted near-infrared rays IR1 and the received near-infrared rays IR2, the near-infrared sensor 11 recognizes the object and detects the distance between the vehicle 10 and the object and the relative velocity.

In proportion to the reduction in the reflection of the near-infrared rays IR1 at the reflection suppression structures 25, the amount of the near-infrared rays IR1, IR2 that pass through the cover body 23 is increased, so that the transmissivity is 60% or higher. The cover body 23 is thus unlikely to hinder passage of the near-infrared rays IR1, IR2. The amount of the near-infrared rays IR1, IR2 that is attenuated by the cover body 23 is limited to a permissible range. This also allows the near-infrared sensor 11 to readily perform the above-described operations such as object recognition and detection.

When the near-infrared sensor 11, which is arranged rearward of the cover body 23, is heated through operation, the heat may cause condensation on the reflection suppression structures 25, resulting in fogging. However, in the first embodiment, since the reflection suppression structures 25 are covered with the hydrophilization film 34, and the water contact angle is less than 10 degrees. The condensed water spreads on the hydrophilization film 34. This reduces fogging on the reflection suppression structures 25. This allows the reflection suppression structures 25 to sufficiently reduce reflection of the near-infrared rays IR1.

Further, in the near-infrared sensor cover 21, the hard coating layer 31 formed on the front surface of the base 24 increases the impact resistance of the cover body 23. The hard coating layer 31 prevents the front surface of the cover body 23 from being scratched by flying pebbles and the like. Further, the hard coating layer 31 increases the weather resistance of the cover body 23. Thus, the hard coating layer 31 prevents the cover body 23 from being altered or degraded due to sunlight, weather, temperature changes, and the like. This also allows the near-infrared sensor 11 to readily perform the above-described operations such as object recognition and detection.

The wire-like heating element 33, which forms the heater unit 32, generates heat when energized. Some of the heat is transferred to the front surface of the cover body 23. When snow accumulates on the front surface of the cover body 23, the snow is melted by the heat from the heating element 33, which is generated when the heating element 33 is energized. This allows the near-infrared sensor 11 to fulfill the object recognition function and the detection function, even when it is snowing.

In the near-infrared sensor cover 21 of the first embodiment, the heater unit 32 is formed by the wire-like heating element 33, which generates heat when energized as described above. The heating element 33 is formed on part of the rear surface of the base 24 by performing sputtering, printing, or application of the material using a dispenser (liquid constant delivery device), so that the heater unit 32 is provided on part of the rear surface of the base 24. Thus, unlike conventional near-infrared sensor covers, no heater film is required to form the heater unit 32. Accordingly, the snow melting function can be fulfilled without troublesome operations such as bonding of a heater film to the base 24.

The near-infrared sensor cover 21 of the first embodiment includes a rear portion that includes the rear surface of the base 24. Part of the rear portion of the base 24 is formed by the reflection suppression structures 25. Thus, unlike conventional near-infrared sensor covers, the cover body 23 does not require bonding a heater film to the rear surface of the base 24 and then attaching an additional reflection suppression layer to the heater film, during the manufacture of the cover body 23. The reflection suppression structures 25, which have minute asperities and reduce reflection, can be easily formed on part of the rear portion of the base 24 by simply performing microfabrication on the molding die and injection molding using the molding die. This provides the near-infrared sensor cover 21 with the function of reducing reflection of the near-infrared rays IR1 without an operation for forming a reflection suppression layer.

In addition to the ones listed above, the first embodiment has the following advantages.

In conventional techniques, a heater film used as a heater unit has a multilayer structure including two transparent bases, a heating element, and an adhesive layer, which are stacked together. An increase in the number of layers causes various drawbacks including the ones discussed below.

(a) The use of a heater film increases the number of interfaces between layers, at which reflection and absorption of near-infrared rays take place. Accordingly, the amount of reflection and absorption of near-infrared rays increases due to the heater unit. This reduces the detection accuracy of the near-infrared sensor.

(b) A not insignificant amount of near-infrared rays are refracted at the interface between layers. As the number of interfaces increases, the total refraction angle of the near-infrared rays increases. This reduces the detection accuracy regarding angles of the near-infrared sensor.

(c) As the number of layers increases, the number of manufacturing steps and the quantity of material for the heater unit are increased, which increases the manufacturing costs.

(d) Adjacent layers may peel from each other. Thus, as the number of layers increases, the number of sections of possible peeling also increases. Peeling is more likely to occur as the difference in the coefficient of thermal expansion between adjacent layers increases. It thus becomes difficult to ensure close attachment at the interfaces as the number of layers increases.

In contrast, the heater unit 32 is formed by the heating element 33 in the first embodiment. Since the number of layers of the heater unit 32 is one, which is less than that in a case in which a heater unit is formed by a heater film. Accordingly, the present embodiment improves the configuration with regard to the items (a) to (d), as compared to a configuration in which the heater unit is formed by a heater film.

Second Embodiment

A near-infrared sensor cover 41 according to a second embodiment will now be described with reference to FIGS. 4 to 6.

Figure 4:
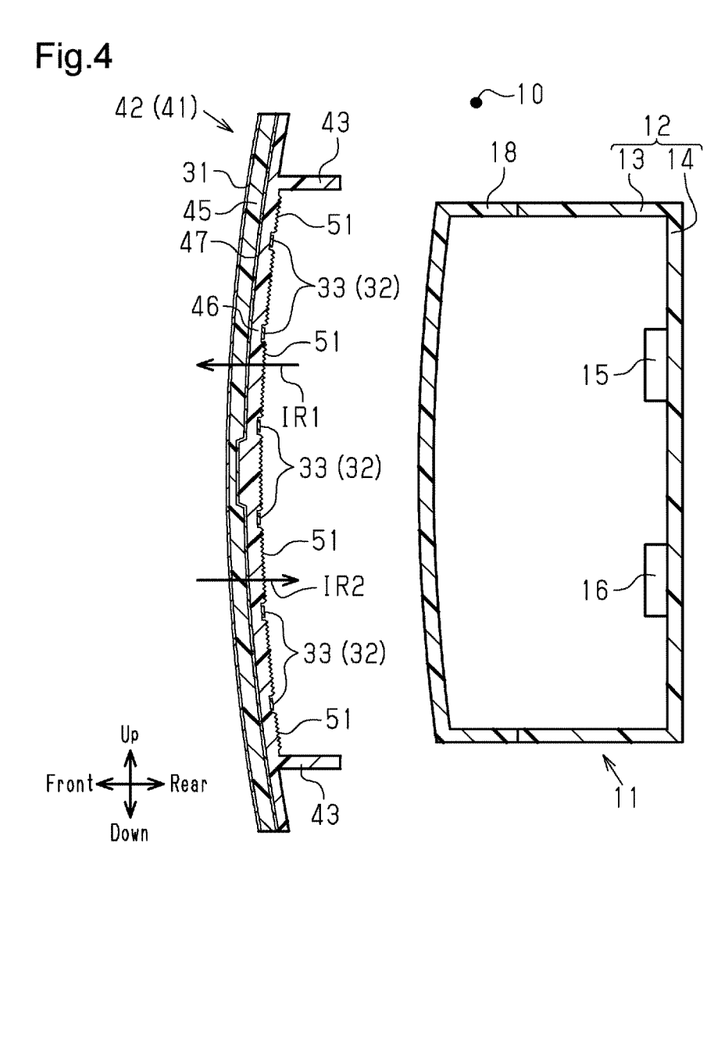
FIG. 4 is a cross-sectional side view showing a near-infrared sensor cover according to a second embodiment, together with a near-infrared sensor.

In the second embodiment, the near-infrared sensor cover 41 is provided separately from a near-infrared sensor 11 as shown in FIG. 4. More specifically, the near-infrared sensor 11 includes a case 12, a transmitting unit 15, a receiving unit 16, and a cover 18. The transmitting unit 15 and the receiving unit 16 are attached to the case 12. The cover 18 is arranged forward of the case 12 to cover the transmitting unit 15 and the receiving unit 16. The cover 18 is made of a plastic that contains a visible light blocking pigment, such as PC, PMMA, COP, or plastic glass.

The near-infrared sensor cover 41 includes a plate-shaped cover body 42 and an attachment portion 43 protruding rearward from the rear surface of the cover body 42. The cover body 42 is located forward of the cover 18 to indirectly cover the transmitting unit 15 and the receiving unit 16 from the front, with the cover 18 in between. The near-infrared sensor cover 41 is attached to the vehicle 10 at the attachment portion 43.

The near-infrared sensor cover 41 not only covers the transmitting unit 15 and the receiving unit 16 from the front like the cover 17 of the near-infrared sensor 11 in the first embodiment, but also functions as a garnish for decorating the front section of the vehicle 10.

Figure 5A:
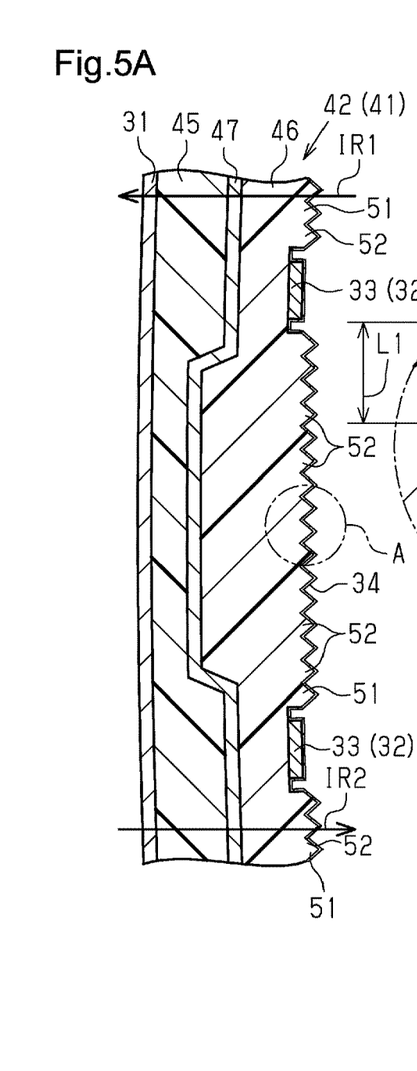
FIG. 5A is an enlarged partial cross-sectional side view showing part of the cover body in FIG. 4.
Figure 5B:
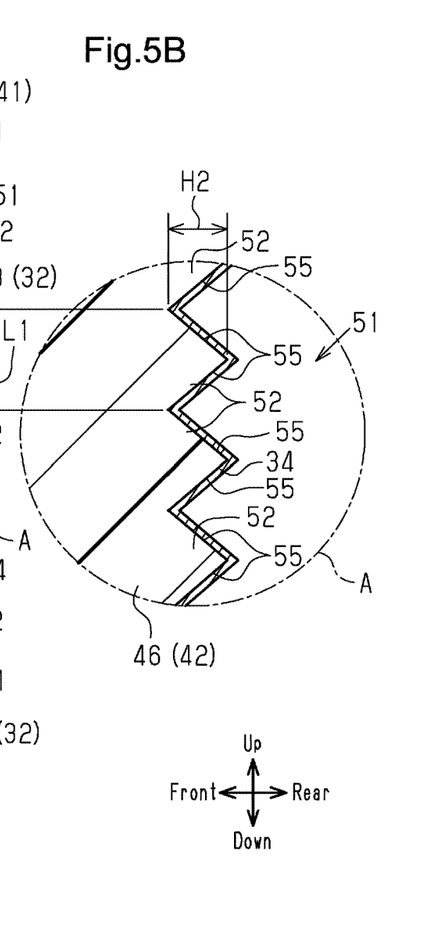
FIG. 5B is an enlarged cross-sectional side view showing section A in FIG. 5A.

Thus, as shown in FIGS. 4 and 5A, the near-infrared sensor cover 41 of the second embodiment basically includes a hard coating layer 31, a base, a heater unit 32, and a hydrophilization film 34, as in the first embodiment. The base includes reflection suppression structures 51 in part of the rear portion of the base.

The near-infrared sensor cover 41 of the second embodiment is different from the near-infrared sensor cover 21 of the first embodiment in the points described below.

The base includes a front base 45 forming the front section and a rear base 46 forming the rear section.

A decorative layer 47 is provided between the front base 45 and the rear base 46. The decorative layer 47 has asperities oriented in the front-rear direction.

The rear base 46 includes a rear portion that includes the rear surface of the rear base 46. The reflection suppression structures 51 are provided in part of the rear portion of the rear base 46. Specifically, the reflection suppression structures 51 are provided in sections of the rear portion of the rear base 46 where the heater unit 32 is not provided.

Each reflection suppression structure 51 includes polygonal pyramid-shaped projections 52.

Like the base 24 of the first embodiment, the front base 45 and the rear base 46 are made of a transparent plastic and have transmissiveness to the near-infrared rays IR1, IR2. The decorative layer 47 is a layer that decorates the near-infrared sensor cover 41 and may be a lustrous decorative layer or a colored decorative layer. The decorative layer 47 is made of a material having high transmissivity to the near-infrared rays IR1, IR2 and a low transmissivity to visible light, and is formed to have asperities oriented in the front-rear direction.

Figure 6:
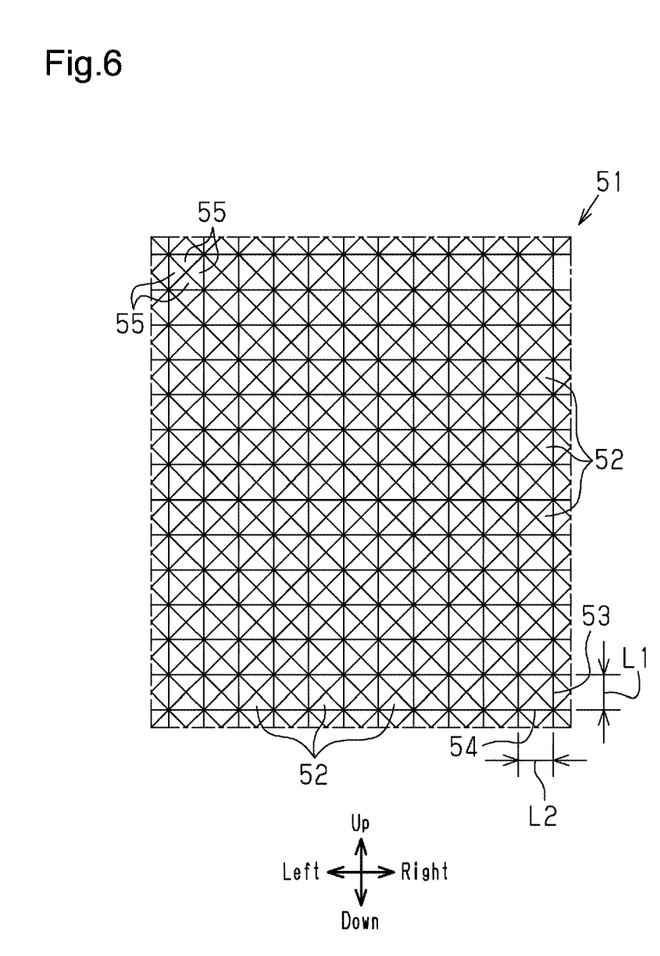
FIG. 6 is an enlarged partial rear view illustrating the reflection suppression structure according to the second embodiment.

FIG. 6 is an enlarged view of a reflection suppression structure 51. The hydrophilization film 34 is not illustrated in FIG. 6. As shown in FIGS. 5B and 6, the projections 52 each have the shape of a quadrangular pyramid. Each projection 52 has first and second base edges 53, 54 that are adjacent and orthogonal to each other. The projections 52 are arranged such that the first base edges 53 are arranged linearly and the second base edges 54 are arranged linearly. That is, the projections 52 are arranged in two intersecting directions while being adjacent to each other. Each projection 52 has an isosceles triangle-shaped cross section. Each projection 52 includes reflection suppression surfaces 55, which are inclined relative to the transmission direction. The height H2 of each projection 52 from the base to the vertex is set to be in the range from 150 nm to 400 nm. The length L1 of each first base edge 53 is set to be in the range from 170 nm to 200 nm, and the length L2 of each second base edge 54 is set to be in the range from 170 nm to 200 nm.

As in the first embodiment, the transmissivity to the near-infrared rays IR1, IR2 of the cover body 42 is 60% or higher in the second embodiment. Also, the reflectance of the near-infrared rays IR1 at the rear surface of the cover body 42 is 10% or lower.

The configuration, other than the above, is the same as the first embodiment. Thus, in the second embodiment, the same components as those in the first embodiment are given the same reference numerals, and detailed explanations are omitted.

In the second embodiment, the reflection suppression structures 51 each include the projections 52, and each projection 52 has the shape of a quadrangular pyramid. Each projection 52 has the first and second base edges 53, 54 that are adjacent and orthogonal to each other. The projections 52 are arranged such that the first base edges 53 are arranged linearly and the second base edges 54 are arranged linearly. Each projection 52 includes the reflection suppression surfaces 55, which are inclined relative to the transmission direction of the near-infrared rays IR1. Each reflection suppression structure 51 of the second embodiment, which has the above-described configuration, reduces reflection using the moth-eye structure.

When the transmitting unit 15 of the near-infrared sensor 11 transmits the near-infrared rays IR1, the near-infrared rays IR1 are radiated on the rear surface of the cover body 42 as shown in FIGS. 4 and 5A. At this time, the reflection suppression surfaces 55 reduce reflection of the near-infrared rays IR1, which are radiated on the reflection suppression structures 51 through the hydrophilization film 34. That is, due to the moth-eye structure, the pseudo-refractive index continuously changes from the vertex to the base of each projection 52. This effectively reduces reflection of the near-infrared rays IR1 on the rear surface of the cover body 42.

Particularly, the reflection suppression structures 51 are formed such that the height H2 of each projection 52 is within the range from 150 nm to 400 nm, and the length L1 of each first base edge 53 and the length L2 of each second base edge 54 are both within the range from 170 nm to 200 nm. These settings further reduce reflection of the near-infrared rays IR1.

The reflection suppression structures 51 reduce the reflectance of the near-infrared rays IR1 to 10% or lower. In correspondence with the reduction, the amount of the near-infrared rays IR1 that pass through the reflection suppression structures 51 is increased.

The near-infrared rays IR1, which have passed through the reflection suppression structures 51, pass through a portion of the rear base 46 that is forward of the reflection suppression structures 51, the decorative layer 47, the front base 45, and the hard coating layer 31 in that order. In this manner, the near-infrared rays IR1 pass through the cover body 42.

The near-infrared rays IR2, which have struck and been reflected by an object outside the vehicle 10, again pass through the cover body 42, specifically the hard coating layer 31, the front base 45, the decorative layer 47, the rear base 46, which includes the reflection suppression structures 51 in part of the rear portion, and the hydrophilization film 34 in that order. After passing through the cover body 42, the near-infrared rays IR2 are received by the receiving unit 16.

The above-described reduction in the reflection of the near-infrared rays IR1 on the reflection suppression structures 51 increases the amount of the near-infrared rays IR1, IR2 passing through the cover body 42, accordingly. Since the transmissivity to the near-infrared rays IR1, IR2 of the cover body 42 is 60% or higher, the cover body 42 is unlikely to hinder passage of the near-infrared rays IR1, IR2. The amount of the near-infrared rays IR1, IR2 that is attenuated by the cover body 42 is limited to a permissible range.

The second embodiment thus achieves the same operations and advantages as the first embodiment. In addition to the ones listed above, the second embodiment achieves the following operations and advantages.

In the second embodiment, each projection 52 has the shape of a polygonal pyramid. Thus, the second embodiment reduces reflection of the near-infrared rays IR1 in a greater number of directions than in the first embodiment. That is, the angular dependence of the incident near-infrared rays IR1 is dealt with.

When the cover body 42 is irradiated with visible light from the front, the visible light passes through the hard coating layer 31 and the front base 45, and is reflected by the decorative layer 47. Thus, when the near-infrared sensor cover 41 is seen from a position forward of the vehicle 10, the decorative layer 47 appears to be located rearward of (on the far side of) the front base 45 through the hard coating layer 31 and the front base 45. The decorative layer 47 thus decorates the near-infrared sensor cover 41, improving the appearance of the near-infrared sensor cover 41 and the surrounding portion.

Particularly, the decorative layer 47 is provided between the front base 45 and the rear base 46 and has asperities. Thus, the decorative layer 47 appears three-dimensionally from a position forward of the vehicle 10. This further improves the appearance of the near-infrared sensor cover 41 and the surrounding portion.

The reflection of visible light on the decorative layer 47 occurs at a position forward of the near-infrared sensor 11. The decorative layer 47 conceals the near-infrared sensor 11. Accordingly, the near-infrared sensor 11 cannot be seen easily from the front of the near-infrared sensor cover 41. The design is thus improved as compared to a case in which the near-infrared sensor 11 can be seen through the near-infrared sensor cover 41.

The above-described embodiments may be modified as follows. The above-described embodiments and the following modification can be combined as long as the combined modifications remain technically consistent with each other.

Figure 7:
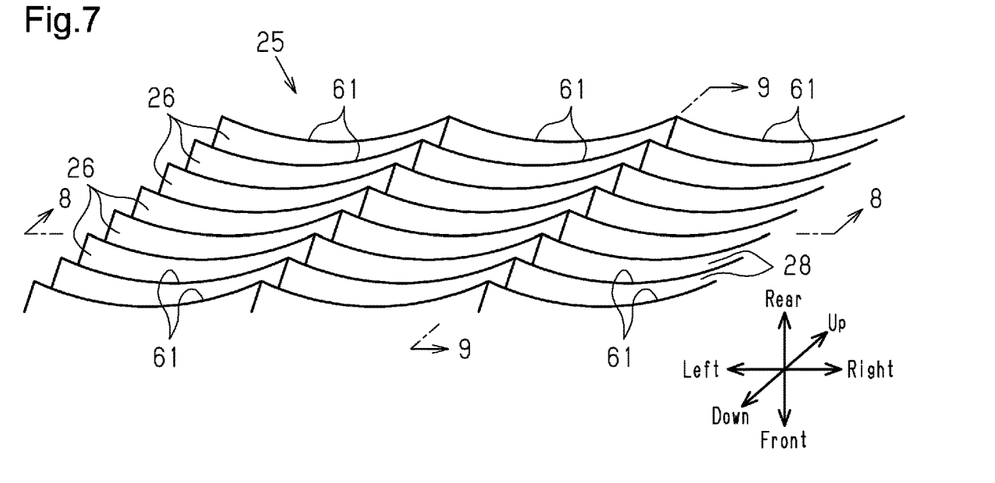
FIG. 7 is a partial perspective view of a modification of the first embodiment, illustrating a reflection suppression structure.
Figure 8:
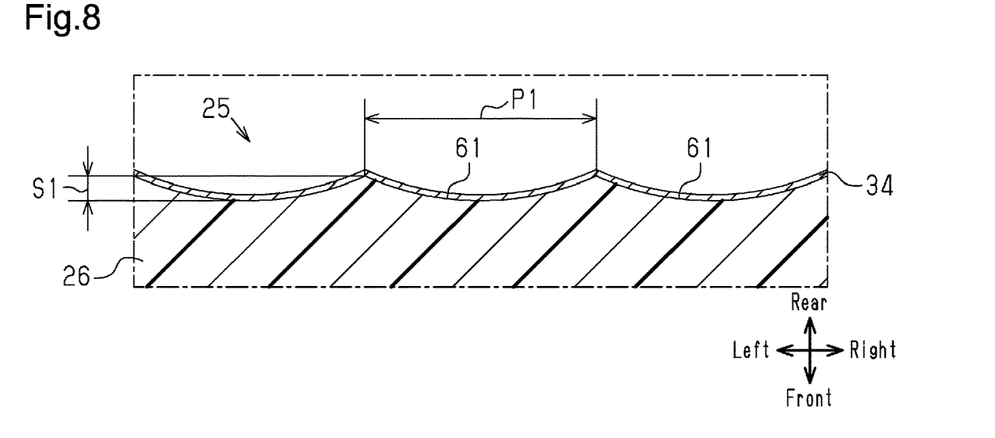
FIG. 8 is a cross-sectional view taken along line 8-8 in FIG. 7.
Figure 9:
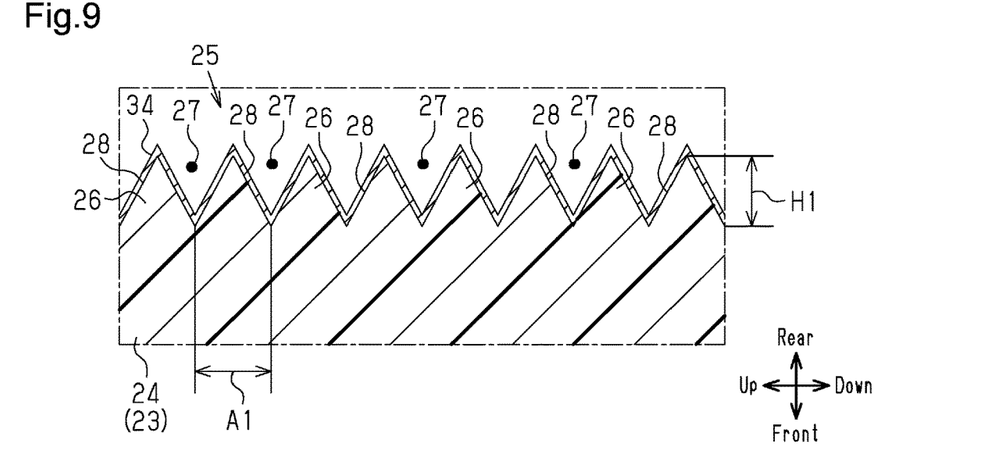
FIG. 9 is a cross-sectional view taken along line 9-9 in FIG. 7.

FIGS. 7 to 9 show a modification of the reflection suppression structures 25 of the first embodiment. The hydrophilization film 34 is not illustrated in FIG. 7. As shown in FIGS. 7 to 9, each protrusion 26 has an isosceles triangle-shaped cross section. Each protrusion 26 includes concavities 61, which are connected together in the direction in which the protrusion 26 extends. Each concavity 61 is arcuately recessed from the vertex toward the base of the protrusion 26, and the depth of the concavity 61 varies in the direction in which the protrusion 26 extends. That is, adjacent concavities 61 are connected to each other at the shallowest sections, in other words, at the highest positions (farthest positions from the base) of the protrusions 26. Each protrusion 26 includes a reflection suppression surface 28, which is inclined relative to the transmission direction of the near-infrared rays IR1 and reduces reflection of the near-infrared rays IR1.

The height H1 of each protrusion 26 from the base to the vertex changes in the direction in which the protrusion 26 extends. The height H1 of each protrusion 26 from the base to the highest position in the vertex is set to be in the range from 150 nm to 400 nm. The measurement A1 of the base of each protrusion 26 in the arrangement direction of the protrusions 26 is set to be in the range from 150 nm to 400 nm.

The radius of each concavity 61 is set to be in the range from 1 mm to 10 mm. It is now assumed that the measurement of each concavity 61 in the direction in which the protrusions 26 extend is a pick feed P1, and that the depth of each concavity 61 is a scallop S1. Each concavity 61 is formed such that the pick feed P1 is in the range from 30 μm to 90 and the scallop S1 is in the range from 0.01 μm to 0.1 μm. The pick feed P1 is the amount of movement of the working tool when machining is performed on the molding surface of the molding die for forming the reflection suppression structures 25.

The present modification is the same as the first embodiment in that the hydrophilization film 34 covers the reflection suppression structures 25 from the rear side.

In the present modification, in which the arcuately shaped concavities 61 are formed to be connected together in the direction in which the protrusions 26 extend, the reflection suppression structures 25 reduce reflection using the moth-eye structure as in the first embodiment. That is, due to the moth-eye structure, the pseudo-refractive index continuously changes from the vertex to the base of each protrusion 26. This effectively reduces reflection of the near-infrared rays IR1 on the rear surface of the cover body 23.

Particularly, since the reflection suppression structures 25 are formed such that the height H1 of each protrusion 26, the measurement A1 of the base, the radius of each concavity 61, the pick feed P1, and the scallop S1 satisfy the above conditions, the reflection of the near-infrared rays IR1 is further effectively reduced.

When the near-infrared sensor cover 21 is provided in the front and rear sections of a vehicle, each near-infrared sensor cover 21 is preferably arranged such that the direction parallel with the protrusions 26 matches with the vehicle width direction. This configuration has a low angular dependency and is capable of detecting near-infrared rays in a wide area and in a wide angular range, as compared to a case in which the near-infrared sensor cover 21 is arranged such that the direction parallel with the protrusions 26 matches with the vertical direction.

The cross-sectional shape of the protrusion 26 in the first embodiment may be changed from a right triangle to an isosceles triangle as in the second embodiment and the modification of FIGS. 7 to 9.

As the cross-sectional shape, an isosceles triangle is more preferable than a right triangle. The included angle between the two sides forming the vertex in the cross section can be set larger in an isosceles triangle than in a right triangle, which improves the productivity and makes the reflection suppression structures 25, 51 less prone to damages.

The reflection suppression structures 25 of the first embodiment and the modification of FIGS. 7 to 9 may form all or part of the sections in the rear portion of the base 24 that are different from sections in which the heater unit 32 is provided.

Likewise, the reflection suppression structures 51 of the second embodiment may form all or part of the sections in the rear portion of the rear base 46 that are different from sections in which the heater unit 32 is provided.

The reflection suppression structures 51 of the second embodiment may include projections 52 each having the shape of a polygonal pyramid other than quadrangular pyramid. For example, the projections 52 may have the shape of a triangular pyramid or a hexagonal pyramid. Further, the reflection suppression structures 51 may include projections 52 each having the shape of a cone instead of a polygonal pyramid.

The hydrophilization film 34, which covers the heater unit 32 from the rear side, may be omitted, so that only the reflection suppression structures 25, 51 may be covered with the hydrophilization film 34.

The configuration of the base in the near-infrared sensor cover 21 of the first embodiment and the modification of FIGS. 7 to 9, which functions as the cover 17 of the near-infrared sensor 11, may be used as the configuration of the base in the near-infrared sensor cover 41 of the second embodiment, which is provided separately from the near-infrared sensor 11. Also, the configuration of the base in the near-infrared sensor cover 41 of the second embodiment may be used as the configuration of the base in the near-infrared sensor cover 21 of the first embodiment and the modification of FIGS. 7 to 9.

The hard coating layer 31 may be formed to have a fractal structure so as to have a water repellency.

The near-infrared sensor covers 21, 41 can be used in a case in which the near-infrared sensor 11 is mounted in a section of the vehicle 10 different from the front section, for example, in the rear section. In this case, the near-infrared sensor 11 transmits the near-infrared rays IR1 rearward from the vehicle 10. The near-infrared sensor covers 21, 41 are arranged forward of the transmitting unit 15 in the transmission direction of the near-infrared rays IR1, that is, rearward of the transmitting unit 15 in the vehicle 10.

The near-infrared sensor covers 21, 41 can be used in a case in which the near-infrared sensor 11 is mounted in each of the sides in the front section or the rear section of the vehicle 10, that is, the front corners or the rear corners.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A near-infrared sensor cover configured to cover a transmitting unit and a receiving unit for near-infrared rays in a near-infrared sensor, the near-infrared sensor cover comprising:
   a cover body having transmissiveness to near-infrared rays, wherein
   the cover body includes:
      a base made of a plastic, and
      a heater unit that is arranged rearward of the base in a transmission direction of the near-infrared rays and includes a wire-like heating element, the heating element configured to generate heat when energized,
   the base includes a rear portion that includes a rear surface of the base in the transmission direction,
   in the rear portion of the base, at least part of a section that is different from a section in which the heater unit is provided is formed by a reflection suppression structure including asperities, and
   the asperities include a reflection suppression surface that is inclined relative to the transmission direction and reduces reflection of the near-infrared rays.

2. The near-infrared sensor cover according to claim 1, wherein
   the reflection suppression structure includes protrusions, the protrusions each include the reflection suppression surface and are adjacent to and parallel with each other, and
   each protrusion has a triangular cross section.

3. The near-infrared sensor cover according to claim 2, wherein
   a height of each protrusion from a base to a vertex is constant in a direction in which the protrusion extends,
   the height of each protrusion is set to be in a range from 150 nm to 400 nm, and
   a measurement of the base of each protrusion in an arrangement direction of the protrusions is set to be in a range from 170 nm to 200 nm.

4. The near-infrared sensor cover according to claim 2, wherein
   each protrusion includes concavities that are connected together in a direction in which the protrusion extends,
   each concavity is arcuately recessed from a vertex toward a base of the protrusion, and a depth of the concavity varies in the direction in which the protrusion extends,
   a height of each protrusion from the base to a highest position in the vertex is set to be in a range from 150 nm to 400 nm,
   a measurement of the base of each protrusion in an arrangement direction of the protrusions is set to be in a range from 150 nm to 400 nm,
   a radius of each concavity is set to be in a range from 1 mm to 10 mm,
   a pick feed, which is a measurement of each concavity in a direction in which the protrusions extend, is set to be in a range from 30 µm to 90 µm, and
   a scallop, which is a depth of each concavity, is set to be in a range from 0.01 µm to 0.1 µm.

5. The near-infrared sensor cover according to claim 1, wherein
   the reflection suppression structure includes projections each having a shape of a polygonal pyramid and the reflection suppression surface, and
   the projections are arranged in two intersecting directions, while being adjacent to each other.

6. The near-infrared sensor cover according to claim 5, wherein
   each projection has a shape of a quadrangular pyramid and includes first and second base edges that are adjacent to each other,
   a length of the first base edge is set to be in a range from 170 nm to 200 nm,
   a length of the second base edge is set to be in a range from 170 nm to 200 nm,
   the projections are arranged such that the first base edges are arranged linearly and the second base edges are arranged linearly, and
   a height of each projection is set to be in a range from 150 nm to 400 nm.

7. The near-infrared sensor cover according to claim 1, comprising:
   a hydrophilization film that is provided rearward in the transmission direction of the reflection suppression structure,
   wherein the reflection suppression structure is covered with the hydrophilization film.

* * * * *